United States Patent Office 3,270,010
Patented August 30, 1966

3,270,010
4(3-DIMETHYLAMINOPROPYL)-2-PHENYL-2H-1,4-BENZOTHIAZIN-3(4H)-ONE
Herman E. Faith, Indianapolis, Ind., assignor to The Dow Chemical Company, Midland, Mich., a corporation of Delaware
No Drawing. Filed Sept. 19, 1963, Ser. No. 310,143
4 Claims. (Cl. 260—243)

This invention relates to improved and novel salts of 4(3-dimethylaminopropyl) - 2 - phenyl-2H - 1,4 - benzothiazin-3(4H)-one and to the method of preparing the same.

The above-identified benzothiazinone has been described previously and its hydrochloride salt isolated and characterized. Said hydrochloride salt, however, has been found to be difficult to crystallize from aqueous solutions. In addition, the hydrochloride salt suffers from the disadvantage that it is hygroscopic and thus does not lend itself to the preparation of stable pharmaceutical dosage forms.

These and other disadvantages of the prior benzothiazinone compound and the hydrochloride salt thereof are overcome in the improved dicarboxylic acid salts of the present invention.

The improved salts contain equimolar proportions of the benzothiazinone base and of the dicarboxylic acid. Thus, the compounds of the invention may be represented by the formula

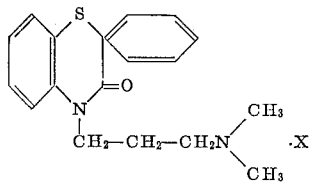

where X represents an acid selected from oxalic, succinic, maleic, fumaric, malic, tartaric, phthalic or other pharmacologically acceptable dicarboxylic acid. The novel salts are crystalline solids, somewhat soluble in alcohol and relatively insoluble in ethyl ether and in aliphatic hydrocarbons.

The novel salts of the invention possess activity as tranquilizers as well as anticholinergic agents and have been found to be particularly useful for administration to laboratory animals in studying the behavior thereof and in ascertaining drug effects on the central and peripheral nervous system. The compounds are also useful as fungicides for the control of plant pathogens.

The free dimethylaminopropyl-phenylbenzothiazinone base may be prepared by known methods, as, for example, by the condensation of α-bromo-phenylacetic acid or an ester thereof with o-aminothiophenol to produce 2-phenyl-2H-1,4-benzothiazin-3(4H)-one as an intermediate and then reacting said intermediate with sodium hydride and 3-chloro-N,N-dimethylpropyl amine.

In the preparation of the compounds of the invention, one molar proportion of 4(3-dimethylaminopropyl)-2-phenyl-2H-1,4-benzothiazin-3(4H)-one is dissolved in a suitable solvent and about one molar proportion of a pharmacologically acceptable dicarboxylic acid is added to the resulting solution. The dicarboxylic acid can be added directly or in the form of a solution in an organic solvent miscible with the solution of the benzothiazinone. Suitable solvents include lower aliphatic alcohols such as methanol, ethanol and propanol, aromatic hydrocarbons such as benzene and toluene, aliphatic ethers such as ethyl ether and isopropyl ether, and mixtures of two or more of such solvents. The formation of the desired salt takes place readily when the benzothiazinone and dicarboxylic acid are brought together in solution and the resulting product may be recovered by crystallization or precipitation followed by filtration and drying. Precipitation of the salt product is accomplished directly by contacting the reactants in a solvent such as ethyl ether in which the salt product is relatively insoluble or by adding sufficient ether or aliphatic hydrocarbon to a solution of the salt in another solvent.

The following examples illustrate the invention but are not to be construed as limiting the same.

*Example 1.—4(3-dimethylaminopropyl)-2-phenyl-2H-1,4-benzothiazin-3(4H)-one oxalate*

2-phenyl-2H-1,4-benzothiazin-3(4H)-one (7.24 grams) was warmed at 80° C. with 0.76 gram of sodium hydride in 40 milliliters of dry toluene for 30 minutes and 3.65 grams of 3-chloro-N,N-dimethylpropylamine in 30 milliliters of dry toluene added thereto dropwise over a 2-hour period while the temperature of resulting mixture was raised to refluxing. Refluxing was continued for an additional 5 hours and the toluene solution then extracted with dilute hydrochloric acid. The acid solution was made alkaline with sodium hydroxide solution to precipitate a solid amine product, 4(3-dimethylaminopropyl) - 2-phenyl-2H-1,4-benzothiazin-3(4H)-one, M.P. 69–71° C. Addition of an equimolar amount of oxalic acid to an ether solution of said benzothiazinone caused precipitation of the 4(3-dimethylaminopropyl)-2-phenyl-2H-1,4-benzothiazin-3(4H)-one oxalate product. The latter was recrystallized from anhydrous Formula 30 alcohol in a yield of 10.7 grams (85.5%) and was found to have a melting point of 168°–169° C.

*Example 2.—4(3-dimethylaminopropyl)-2-phenyl-2H-1,4-benzothiazin-3(4H)-one maleate*

685 grams (2.1 moles) of 4(3-dimethylaminopropyl)-2-phenyl-2H-1,4-benzothiazin-3(4H)-one was dissolved in 1280 milliliters of anhydrous methanol and the resulting solution added gradually with cooling to a solution of 243 grams (2.1 moles) of maleic acid in 14.15 liters of anhydrous ether. The crystalline 4(3-dimethylaminopropyl) - 2-phenyl-2H-1,4-benzothiazin-3(4H)-one maleate product precipitated from the reaction mixture and was collected by filtration in a yield of 900 grams. The product was found to melt at 121°–122° C.

*Example 3.—4(3-dimethylaminopropyl)-2-phenyl-2H-1,4-benzothiazin-3(4H)-one succinate*

2.5 grams (0.008 mole) 4(3-dimethylaminopropyl)-2-phenyl-2H-1,4-benzothiazin-3(4H)-one in a concentrated absolute ethanol solution was mixed with 0.905 gram (0.008 mole) of succinic acid in absolute ethanol. Dilution of the alcohol solution with anhydrous ether caused the precipitation of the 4(3-dimethylaminopropyl)-2-phenyl - 2H - 1,4 - benzothiazin - 3(4H) - one succinate product. The latter was separated by filtration and was found to be a crystalline solid melting at 104°–105° C.

*Example 4.—4(3-dimethylaminopropyl)-2-phenyl-2H-1,4-benzothiazin-3(4H)-one tartrate*

4(3-dimethylaminopropyl) - 2 - phenyl-2H-1,4-benzothiazin-3-(4H)-one (2.5 grams) in a concentrated absolute ethanol solution was mixed with a solution of 1.15 grams of tartaric acid in absolute ethanol. Dilution of the alcohol solution with anhydrous ether caused the precipitation of the desired tartrate as a crystalline salt (M.P. 55°–60° C.).

*Example 5*

Following the procedure of Example 4, 2.5 grams of the benzothiazinone is reacted with 1.4 grams of phthalic acid to produce the 4(3-dimethylaminopropyl)-2-phenyl-2H-1,4-benzothiazin-3(4H)-one phthalate as a crystalline solid having a molecular weight of 492.

In a similar fashion one molar proportion of 4(3-dimethylaminopropyl) - 2 - phenyl - 2H - 1,4 - benzothiazin-3(4H)-one is reacted with one molar proportion of maleic acid or of fumaric acid to produce 4(3-dimethylaminopropyl) - 2 - phenyl - 2H - 1,4 - benzothiazin - 3(4H) - one malate or 4(3-dimethylaminopropyl) - 2 - phenyl - 2H-1,4-benzothiazin-3-(4H)-one fumarate, respectively.

In a representative operation, aqueous suspensions of the 4(3-dimethylaminopropyl) - 2 - phenyl - 2H - 1,4 - benzothiazin-3(4H)-one maleate product of Example 2 were administered to laboratory mice at various dosages by intraperitoneal injection. One hour after administration of said product the mice were injected subcutaneously with 1,4-dipyrrolidino-2-butyne at a dosage of 20 mg. per kg. The latter dosage of said butyne compound normally causes tremors and other signs of parasympathetic nervous system stimulation. The maleate product was effective for blocking both the tremors and other signs of parasympathetic stimulation and the 50 percent effective dose for such blocking was found to be 29.5 mg. per kg.

In a further representative operation viable spores of the tomato early blight organism (*Alternaria solani*) were suspended in a 0.01 molar phosphate buffer at $pH_7$ and sufficient 4(3 - dimethylaminopropyl) - 2-phenyl-2H-1,4-benzothiazin-3(4H)-one oxalate was dissolved therein to provide 250 parts by weight of said compound per million parts of the resulting solution. An exactly similar solution was prepared with a suspension of a yeast organism (*Monilia fructicola*). Each such treated suspension and portions of the untreated organism suspensions were placed in individual sealed containers and shaken gently for 24 hours at room temperature. Thereafter each suspension was plated in a Petri dish on a nutrient agar suitable for growth of the respective organism concerned. All agar plates were incubated under good growing conditions until readily visible growth or organisms from the untreated suspensions was obtained. At this time there was no observable growth on the nutrient plated with the treated suspensions, indicating 100 percent control of the test organisms.

I claim:

1. A salt of 4(3 - dimethylaminopropyl) - 2-phenyl-2H-1,4-benzothiazin-3(4H)-one and an equimolar proportion of a dicarboxylic acid selected from the group consisting of oxalic acid, maleic acid and succinic acid.

2. 4(3 - dimethylaminopropyl) - 2 - phenyl - 2H-1,4 - benzothiazin - 3 - (4H)-one maleate.

3. 4(3 - dimethylaminopropyl) - 2 - phenyl - 2H - 1, 4-benzothiazin-3-(4H)-one succinate.

4. 4(3 - dimethylaminopropyl) - 2 - phenyl - 2H - 1,4-benzothiazin-3(4H)-one oxalate.

References Cited by the Examiner

UNITED STATES PATENTS

| 3,006,916 | 10/1961 | Winthrope et al. | 260—243 |
| 3,124,577 | 3/1964 | Lowrie | 260—243 |
| 3,143,545 | 8/1964 | Lowrie | 260—243 |
| 3,166,554 | 1/1965 | Krapcho | 260—243 |

FOREIGN PATENTS

| 563,660 | 9/1958 | Canada. |

WALTER A. MODANCE, *Primary Examiner.*

JOHN M. FORD, *Assistant Examiner.*